United States Patent [19]

Hogg et al.

[11] Patent Number: 4,835,680
[45] Date of Patent: May 30, 1989

[54] ADAPTIVE PROCESSOR ARRAY CAPABLE OF LEARNING VARIABLE ASSOCIATIONS USEFUL IN RECOGNIZING CLASSES OF INPUTS

[75] Inventors: Tad Hogg, Anchorage, Ak.; Bernardo A. Huberman, Palo Alto, Calif.

[73] Assignee: Xerox Corporation, Stamford, Conn.

[21] Appl. No.: 711,930

[22] Filed: Mar. 15, 1985

[51] Int. Cl.$^4$ .......................... G06F 7/00; G06F 15/18
[52] U.S. Cl. .................................. 364/200; 364/232.2; 364/231.9
[58] Field of Search ... 364/200 MS File, 900 MS File; 382/41, 27, 34, 37, 49

[56] References Cited

U.S. PATENT DOCUMENTS

| | | | |
|---|---|---|---|
| 3,106,698 | 5/1986 | Unger | 340/172.5 |
| 3,273,125 | 9/1966 | Jakowatz | 364/900 |
| 3,496,387 | 2/1970 | Hendrix | 307/201 |
| 3,566,359 | 2/1971 | Connelly | 364/900 |
| 3,678,461 | 7/1972 | Choate et al. | 364/200 |
| 4,060,713 | 9/1972 | Golay | 364/416 |
| 4,065,808 | 1/1985 | Schomberg et al. | 364/200 |
| 4,193,115 | 3/1980 | Albas | 364/300 |
| 4,215,401 | 8/1985 | Holsztynski et al. | 364/200 |
| 4,254,474 | 3/1981 | Cooper et al. | 364/900 |
| 4,270,169 | 3/1981 | Hunt et al. | 364/200 |
| 4,384,273 | 2/1971 | Ackland et al. | 382/34 |
| 4,395,699 | 3/1980 | Sternberg | 382/41 |
| 4,493,048 | 1/1985 | Kung et al. | 364/754 |
| 4,533,993 | 8/1985 | McCanny et al. | 364/200 |
| 4,591,980 | 5/1986 | Huberman et al. | 364/200 |
| 4,599,692 | 7/1986 | Tan et al. | 364/513 |
| 4,599,693 | 7/1986 | Denenberg | 364/513 |

FOREIGN PATENT DOCUMENTS 0085545 8/1983 European Pat. Off. .

OTHER PUBLICATIONS

D. H. Lawrie, "Access and Alignment of Data in an Array Processor," IEEE Transactions on Computers, pp. 1145-1155, Dec. 1975.

Beurle, "Properties of a Mass of Cells Capable of Regenerating Pulses" Royal Society of London Philosophical Trans., vol. 240 (B.667) pp. 8 et seq. (1956).

D. R. Smith et al., "Maintained Activity in Neural Nets", ACM 1969.

G. M. Edelman et al., "Selective Networks Capable of Representative Transformations...Memory" Proceedings of National Academy of Science, vol. 79, pp. 2091-2095 (Mar., 1982).

(List continued on next page.)

*Primary Examiner*—Gareth D. Shaw
*Assistant Examiner*—Jonathan C. Fairbanks
*Attorney, Agent, or Firm*—W. Douglas Carothers, Jr.

[57] ABSTRACT

An adaptive processor array is capable of learning certain flexible or variable associations which learned associations are useful in recognizing classes of inputs, i.e., capable of associating certain types of inputs to fall in the same output basin or field. The adaptive processor array comprises a plurality of identical processing cells arranged in parallel columns and rows to form a two dimensional matrix. Each of the cells in the array include logic and a memory for storing an internal state. The first row of cells in the array form a parallel input to the array and the last row of cells in the array form a parallel output from the array. The cells in the intermediate rows of the array between the first and last row of the array, except for end cells, are individually coupled to two cells in a previous cell row that are positioned diagonally relative to each such row cell and are also individually coupled to two cells in a subsequent row of the array that are positioned diagonally relative to each such row cell. Logic in each cell computes a new output based upon the two inputs received from the diagonal cells in the previous row, which output, based upon whether cell is programmed to follow a rule of attraction or a rule of dissociation, is utilized to move the internal integer value of the cell toward one of two stages, one state being a state of dissimilarity and the other state being a state of similarity. The state of dissimilarity is also referred to as a state of dissociation, separation or expansion.

30 Claims, 6 Drawing Sheets

OTHER PUBLICATIONS

W. H. Kautz, "Cellular Logic-In-Memory Arrays", IEEE Transactions on Computers, pp. 1566–1569, Dec. 1971.

D. d'Humières & Huberman, "Dynamics of Self-Organization in Complex Adaptive Networks", J. Statistical Physics, vol. 34 (314), pp. 361–379, Feb. 1984.

Huberman et al., "Adaptation and Self-Repair in Parallel Computing Structures", Physical Review Letters, vol. 52(12), pp. 1048–1051, Mar. 19, 1984.

Huberman, "Dynamics of Computing Structures", Physica Scripta, vol. T9, pp. 165–169, 1985.

Müller, "Adwendungen lernfähiger Automaten", Regelungstechnik, vol. 13(9), pp. 410–417, Sep., 1965–English Translation of p. 411, right-hand col., last paragraph to p. 412, full left-hand col. included.

Huberman et al., "Dynamic Associations in Nonlinear Computing Arrays", Physica Scripta, vol. 32, pp. 271–273, Oct. 1985.

Hogg et al., "Parallel Computing Structures Capable of Flexible Associations and Recognition of Fuzzy Inputs", Journal of Statistical Physics, vol. 41(1/2), pp. 115–123, Oct. 1985.

ADAPTIVE PROCESSOR ARRAY CAPABLE OF LEARNING VARIABLE ASSOCIATIONS USEFUL IN RECOGNIZING CLASSES OF INPUTS

RELATED APPLICATION

This invention is another member of a class of adaptive processor arrays of the type disclosed in U.S. Ser. No. 580,919 filed Feb. 16, 1984, now U.S. Pat. No. 4,591,980 in the name of the same inventors herein and assigned to the same assignee herein.

BACKGROUND OF THE INVENTION

This invention relates to digital parallel processors or processor arrays of the type having a two dimensional matrix of substantially identical interconnected cells adapted to receive signals from other cells in the matrix to sequentially perform transformational operations on a plurality of input signals to produce an output based upon such operations.

There are many different examples of processor arrays in the prior art as exemplified in the above-identified related application. One of the most fundamentally referred to examples of a processor array is Unger U.S. Pat. No. 3,106,698, which discloses a two dimensional matrix of identical processing elements or cells having a logic and storage capability. Each cell is connected to a plurality of neighboring cells and input data or signals may be introduced directly into each cell from an equivalent cell via an input array. Processing in each cell is accomplished under the control of a master control which issues general orders to all of the cells to permit simultaneous processing of the data in each cell and transfer information between cells through multiplexor links. A series of transformations are performed on the input data by the cells to arrive at an output matrix.

From Unger there proceeds a whole realm of parallel processor array structures, many having a principal function of recognition, analization, digitization or classification of patterns or images. However, these arrays are aimed at precise and accurate results, that is for given inputs there will be definitive outputs, i.e., an output for each input so that different outputs may represent a particular pattern or image event, e.g., an edge. On the other hand, the processor array of this invention has an adaptive behavior, i.e., is capable of operating in a nonlinear manner so that various kinds of inputs come to mean certain desired outputs although the inputs may not necessarily be the same.

SUMMARY OF THE INVENTION

According to this invention, an adaptive processor array is capable of learning certain flexible or variable associations which learned associations are useful in recognizing classes of inputs, i.e., capable of associating certain types of inputs to fall in the same output class or field.

The adaptive processor array of this invention comprises a plurality of identical processing cells arranged in parallel orthogonal columns and rows to form a two dimensional matrix. Each of the cells in the array include logic means and a memory for storing a memory state. The first row of cells in the array form a parallel input to the array and the last row of cells in the array form a parallel output from the array. The cells in the intermediate rows of the array between the first and last row of the array are individually coupled to two cells in a previous cell row that are positioned diagonally relative to each such row cell and are also individually coupled to two cells in a subsequent row of the array that are positioned diagonally relative to each such row cell. Logic means in each cell computes a new value based upon the two inputs to the cell, which value, based upon whether cell is programmed to follow a rule of attraction or rule of dissociation, is utilized to move the accumulated value of the cell toward one of two states, one state being a state of dissimilarity and the other state being a state of similarity. The state of dissimilarity may be referred to herein as a state of dissociation, separation or expansion. The state of similarity may be referred to herein as a state of coalescence or contraction or attraction.

The new value toward either of such states is presented as an output to be coupled as input to two cells in a subsequent row positioned diagonally relative to the output cell. The final parallel output from the last row of the array represents a condition whether the input or inputs presented fall in one or more classes representative of a basin of attraction or a field of inputs. The recognition of inputs being classified to particular classes or fields of input is accomplished by learned association of the inputs initially presented to the array, which learned association based upon the use of two algorithms which respectively provide a rule of contraction and a rule of expansion utilized in programming of the cells.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
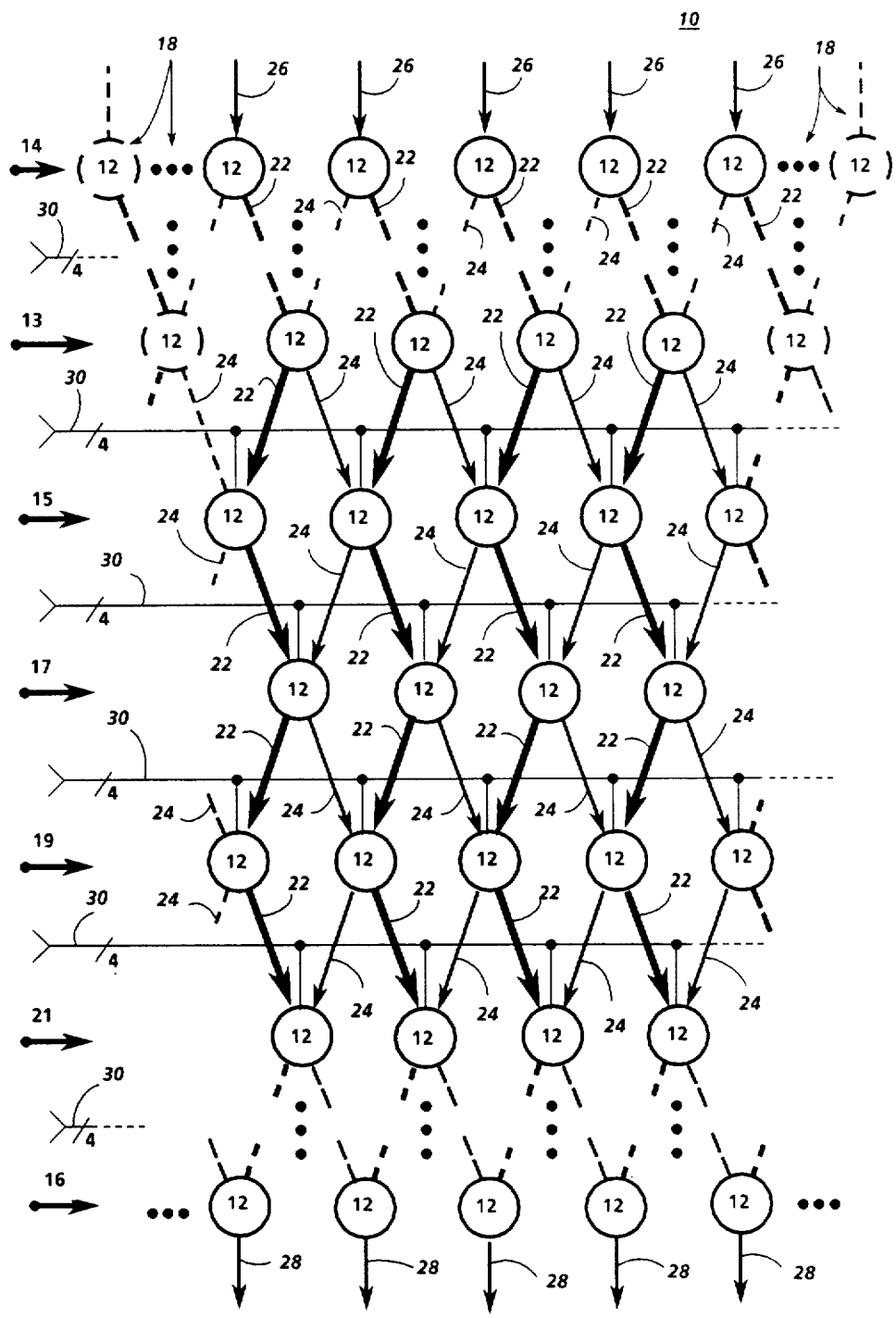
FIG. 1 is an illustration of the adaptive processor array according to this invention.

Reference is made to FIG. 1 illustrating a representative example of the adaptive processor array 10 of this invention. The array 10 comprises a plurality of interconnected identical processing cells arranged in parallel m rows 13, and n columns. In the representation shown, cells 12 in given row intermediate of the first and last rows 14 and 16 (e.g. intermediate rows 13, 15, 19, 17 or 21) are coupled to diagonally positioned cells in the previous row and to diagonally positioned cells in the subsequent row. The number of columns n in the array is limited by the number of fields that the processor will need to deal with, so that if there are M fields or classes to recognize and there are only two possible outputs, i.e., whether the output is the same as or different from a given field, then the upper limit is $Z^n$ with n the number of cells in the last row. The limitation on the number of rows m is based upon the number of computations necessary to make a final determination as to whether a given input is the same as or different from a given field.

FIG. 1 represents only a portion of array 10 for purposes of explanation and simplification. The dotted line representations indicate the possible existence of additional rows of cells after input row 14 of cells and prior to output row 16 of cells as well as additional columns of cells indicated at 18 and 20.

Other than the cells in input row 14, each cell has two inputs from two different cells in the previous row, one input is designated for purposes of explanation as the primary input 22 and the other input is designated as the secondary input 24. The significance of these input designations will become clearer as the description of the processor progresses. The cells 12 in input row 14 have one input 26 which is a parallel input to array 10 representative, for example, of a numerical physical measurement.

Other than the cells in output row 16, each cell has two outputs, which for the sake of simplicity will be also identified as outputs 22 and 24, the same numerals identifing the two inputs from two different cells in a previous cell row. However, the outputs 22 and 24 from a single cell 12 will always be the same or identical whereas the two inputs 22 and 24 to a cell 12 will not necessarily be the same (and will most likely not be the same) since these inputs are from two different cell outputs of separate cells in the previous row of cells.

It is helpful to view the array 10 from the standpoint of flow path through the cell matrix from the standpoint of the primary input 22. In viewing FIG. 1, each of the primary inputs 22 are shown as thicker lines compared to secondary inputs 24. By "primary", it is meant that the numerical sign on this input is dominate over the numerical sign of the secondary input. Therefore, if the sign on the numerical value on primary input 22 is negative and the sign on the numerical value on the secondary input 24 is positive, the accepted sign value at the imputted cell will be negative. There is one exception, however. If the numerical value of primary input 22 is zero, then the sign of the secondary input 24 will be the accepted value, which in the example just given would be positive.

With this frame of mind, one can trace the primary inputs 24 downward through array 10 and determine that the primary inputs, as well as the secondary inputs, take an alternating path through the array representing, for example, a left input $I_L$, to all the cells in a given row and then a right input, $I_R$, in all the cells in the next row and so on. As a result, a given input value proceeds through the cell array and terminates at a corresponding output aligned with an original input but having been processed along the path relative to processed inputs received from immediately adjacent input cells in a previous cell row.

Figure 2:
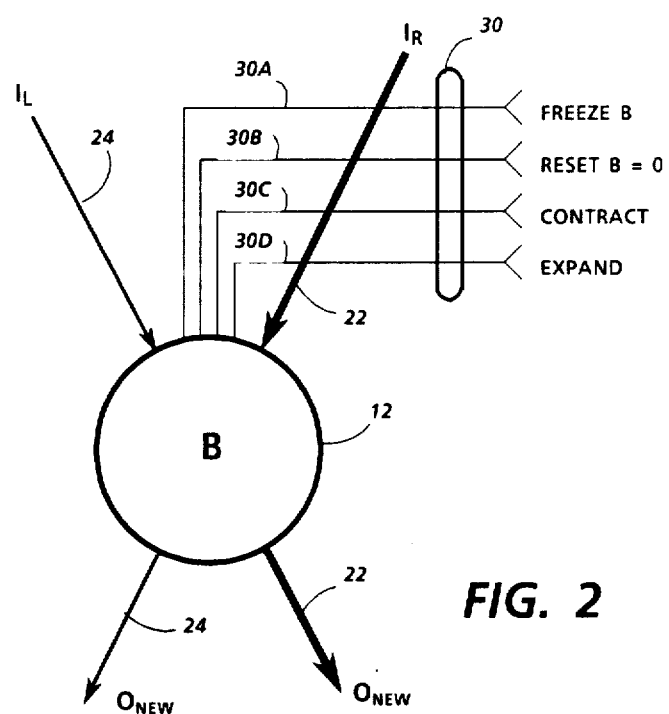
FIG. 2 is an illustration of a single cell in the array which illustrates the functions to be performed by the cell in accordance with the rules used in the operation of the array.

Reference is now made to both FIGS. 1 and 2. In FIG. 2, there is illustrated one cell 12 from array 10. Cell 12 operates on integer data received from two diagonally positioned neighborhood cells from a previous row of cells via primary input 22 or right input, $I_R$, and secondary input 24 or left input, $I_L$. Each cell has an internal memory state represented by the integer B. The memory state can only take on a small set of values. The output, $O_{NEW}$, from cell 12 is based upon the value of inputs $I_L$ and $I_R$ and the value B of its internal state as well as the sign of integer value of the primary input 22. Also, the output, $O_{NEW}$ is used to determine the new internal memory value for B.

Also, supplied to cell 12 are four set conditions wherein if any of the conditions are true, a certain function is performed. These condition inputs are supplied via input lines 30 to all the cells 12 in array 10. Line 30A, when its condition true, requires that the value B of a cell remain unchanged. Line 30B, when its condition true, requires that the value B of a cell be set to zero. Line 30C, when its condition true, requires a cell to follow the contraction rule, which will be subsequently explained. Line 30D, when its condition true, requires a cell to follow the expansion rule, which will also be subsequently explained.

At each time step, K, each cell 12 receives data values from its diagonal neighbors as integer inputs $I_L$ and $I_R$ and computes an output, O, in the following manner:

$$O = max(S_{min}, min(S_{max}, s(I_L, I_R) \cdot (|I_R| + |I_L|) + B)) \tag{1}$$

In equation (1), the integer values $S_{min}$ and $S_{max}$ represent the saturation limit integer, that is maximum and minimum limit wherein all data values processed through the array are constrained to be between these limits or in a specified interval, thereby creating a nonlinear computation. These limits provide a degree of reliability to the array and eliminate unnecessary further processing. $S_{min}$ may be set to be equal to $-S_{max}$ and the internal state, B, of each cell will be represented by an integer within given limits. The value s is the sign value to be taken. In equation (1), $s(I_L, I_R)$ represents the sign function so that one set of alternate rows, such as rows 15 and 17 in FIG. 1, will take on the sign of input $I_R$ whereas the other set of alternate rows, such as rows 19 and 21 will take on the sign of input $I_L$. In each case, the sign of primary input 22 of the cell is taken unless the integer value is zero, in which case the sign of secondary input 24 is taken.

The absolute values of inputs $I_R$ and $I_L$ are added together and multiplied by the the chosen sign, s, and this value is added to present memory state, B. Essentially, equation (1) amounts to adding the magnitude of inputs $I_L$ and $I_R$ to a given cell, choosing the appropriate sign, s, adding the integer value B, and restricting the result to the specified interval $S_{min}$ to $S_{max}$. Any output values equal to the extrema of this interval are termed "saturated".

The foregoing description relative to equation (1) involves the state of the integer B remaining the same, i.e., the value of B is frozen. The following explanation deals with rules for changing B other than reset of B to zero. There are two rules, a rule of contraction and a rule of separation. We also refer to the rule of contraction as a rule of attraction or coalescence and the rule of separation as a rule of expansion or dissociation.

In any case, the dynamics of the rules for coalescence and dissociation of possible points or attractors in a basin of attraction or field of response is to operate on the current output, $O_{NEW}$, of a cell and previous output, $O_{PREV}$, of a cell and modify the value of B. When a local cell is set for computation following the contracting rule, the following algorithm is exploited:

If at least one of $O_{NEW}$ and $O_{PREV}$ is not saturated and $O_{NEW}$ times $O_{PREV}$ is less than zero, then change B by the value of one, with the sign of the change given by the sign of either $O_{NEW}$ or $O_{PREV}$, which ever output has the largest magnitude; otherwise the value of B is to remain unchanged.

It will be noted that this rule will drive two inputs toward having the same output by setting the adaptive procedure in local cells to follow this contracting rule. A single application of the rule changes the internal state B of the cell by ±1.

When a local cell is set for computation following the separating rule, the following algorithm is exploited:

If at least one of $O_{NEW}$ and $O_{PREV}$ is not saturated and $O_{NEW}$ times $O_{PREV}$ is greater than zero, then change B by one, with the sign of the change given the sign opposite of that of either output $O_{NEW}$ or $O_{PREV}$, otherwise the value of B is to remain unchanged.

It will be noted that this rule will drive two inputs toward having separate outputs by setting the adaptive procedure in local cells to follow this separation rule. A single application of the rule changes the internal state B of the cell by ±1.

The following examples will aid in understanding the operation of these two local cell rules wherein the array 10 is to learn associations relative to the state of similarity or, dissimilarity. In the case of the contracting rule, assume that the $O_{PREV}$ is equal to 8 and $O_{NEW}$ is equal to $-9$. Also assume that $S_{max}$ is equal to $-S_{min}$ which is 15. Under the contracting rule, the values at output are to be the same. If they are to be the same, then the value of B is changed in one step intervals until the output closest to zero reaches zero. The resultant effect is to cause both values for $O_{NEW}$ and $O_{PREV}$ to no longer have opposite signs. In the present example, the value of B would decrease, attempting to succeed to a position where both $O_{PREV}$ and $O_{NEW}$ would be not positive values at which point B would be equal to $-8$.

In the case of the separating rule, assume that $O_{NEW}$ is equal to 3 and $O_{PREV}$ is equal to 5. Again also assume $S_{max} = -S_{min} = 15$. Under the separating rule, the values at the array output are not to be the same. If they are not to be the same, i.e., are to be different, then the value of B is changed in one step intervals until the outputs no longer have the same sign.

An examination of the contracting rule leads to the interesting phenomenon in that its contraction mechanism permits many different inputs into array 10 to be mapped into the same output. In the language of dynamical systems, this corresponds to the appearance of a fixed point in the phase space of the system. The contraction of volumes in phase space makes these fixed points attractive in the sense that perturbations quickly relax back to original values.

Figure 4:
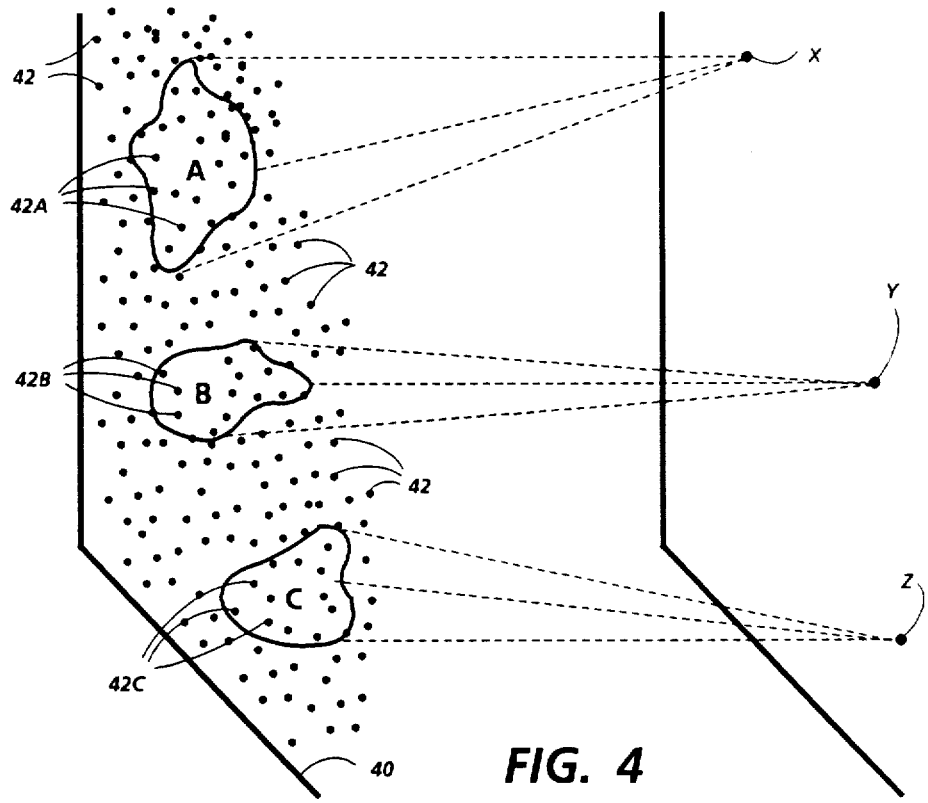
FIG. 4 is an illustration of three basins or fields of inputs A, B and C prior to processing by the adaptive processor array.

As shown in FIG. 4, inputs 42 are represented in the plane 40 by a multitude of dots. Sets of these inputs can be found or classified in certain fields or basins of attraction. In FIG. 4, fields A, B and C are shown. The sets of inputs in each of these fields defines the basin of attraction for a given output, i.e., the inputs are mapped into a specific output which defines the basin of attraction. Thus, the set of inputs 42A in field A will map into output X, the set of inputs 42B in field B will map into output Y and the set of inputs 42C in field C will map into output Z. The contracting rule will force, for example, inputs 42A in basin A all to an output X. Possible inputs outside of field A will be subjected to the separating rule.

The basins of attraction can be dynamically modified using the local cell rules in order to include or exclude a particular set of inputs 42. The processes of coalescence and dissociation are achieved by changing the internal state of each computing cell using the adaptive local cell rules which mimic the global expansion or contraction process desired to be achieved. That such local computation leads to global behavior of this nature is surprising in view of the nonlinearity of the system.

Figure 5:
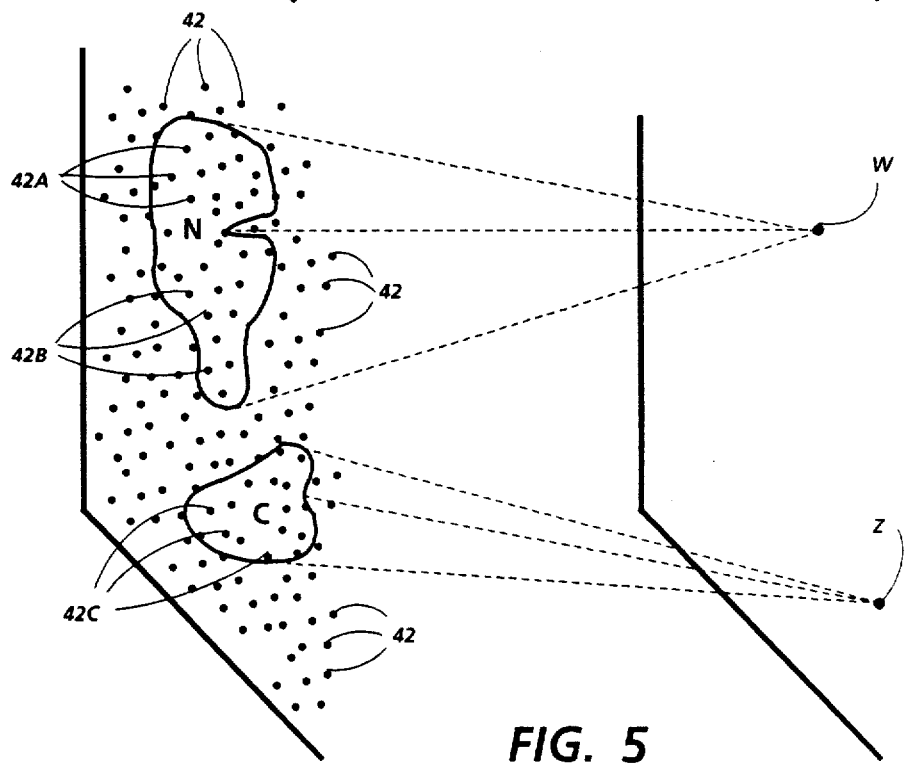
FIG. 5 is an illustration of the three basins or fields of inputs after processing by the adaptive processor array wherein a new basin of attraction, N, has been formed due to coalescence of fields A and B.

In FIG. 5, the global expansion behavior is exemplified for the fields A and B in FIG. 4. With the state of contraction or coalescence set to be true, the sets of inputs fed to the array for fields A and B will form a new basin of attraction or field N which will map into a single output W.

Tables I and II below show the results of an experiment performed on a ten row by six column processor array 10 obeying the previous explained local cell rules of coalescence and dissociation. These tables illustrate the learning capability of array 10 operating under the local cell rules to appropriately adjust the B value of the cells. This is the learning phase of array operation. In Table I, the results were obtained by sending the inputs through array 10 until a coincidence was obtained between outputs. Table II shows the results obtained wherein inputs which were initially in the same basin or field were subsequently separated.

TABLE I

| | Coalescence of Inputs | |
|---|---|---|
| Input | Original Output | Final Output |
| 3 3 3 3 3 3 | + + + + + + | + + + + + + |
| −2 −2 −2 −2 −2 −2 | − − − − − − | + + + + + + |
| 2 −3 3 −2 1 −1 | + − + − + − | + + + + + + |

TABLE II

| | Dissociation of Inputs | |
|---|---|---|
| Input | Original Output | Final Output |
| 3 4 1 4 2 2 | + + + + + + | − − − − − − |
| 2 2 2 5 5 5 | + + + + + + | − − − + + + |
| 4 5 5 3 4 4 | + + + + + + | + + + − − − |

Referring to Table I, the three inputs represent three different samples. For example, they may represent physical parameters such as three samples from a voice pattern. They are all quite different not only in numerical value but also in sign. The integer B in the array cells is set to zero and the contracting rule is set to be true. The original output in Table I shows that the sign of the inputs remained the same after one iteration through the array. It required four iterations through the array to produce the final output shown depicting complete coalescence, i.e., all parallel positive outputs.

In Table II, the three inputs shown represent three different samples. Here the samples have all the same sign but are very different in numerical value. The integer B in the array cells is set to zero and the expanding rule is set to be true. The original output in Table II shows that the sign of the inputs remained the same after one iteration through the array. It required three iterations to provide the dissociation in the final output wherein each input was classified to be a different output, one all negative sign, another three sequentially negative and three positive signs and the third sequentially three positive and three negative signs.

In the examples of these Tables, the numerical values have not been shown for purposes of illustration.

As a continuation of the experiment, the procedure for the above samples of Tables I and II were reversed. The final outputs of Table I were subjected to the expanding rule and it required thirteen iterations to reexpand these coaelescence inputs. In the case of the final outputs of Table II, it required five iterations to recontract these dissociated inputs.

Having illustrated the adaptive behavior the local rules of contraction and expansion, an examination of the behavior of inputs nearby a set of inputs in a field can be accomplished during the merging and dissociation of inputs presented to the array. This amounts to determining how the size and shape of the basins of attraction or fields of input change when conditioned reflexes are obtained in an adaptive environment. This is important in establishing to what extent this array is capable of both input generalizations and its complement, differentiation.

To proceed with this analysis, we used the following two techniques before and after associating given inputs: (1) determining the distribution of sizes of basins of attraction by sending random inputs through the array and counting how many produced each observed output, and (2) determining the size of the basins of attraction by taking each input and measuring the fraction of nearby inputs that are in the same basin of attraction as a function of distance from the original input. Since the set of inputs form an integer lattice, distances between inputs were measured using a street map metric which sets the distance between two points to be the sum of the magnitudes of the differences in each component.

Figure 6:
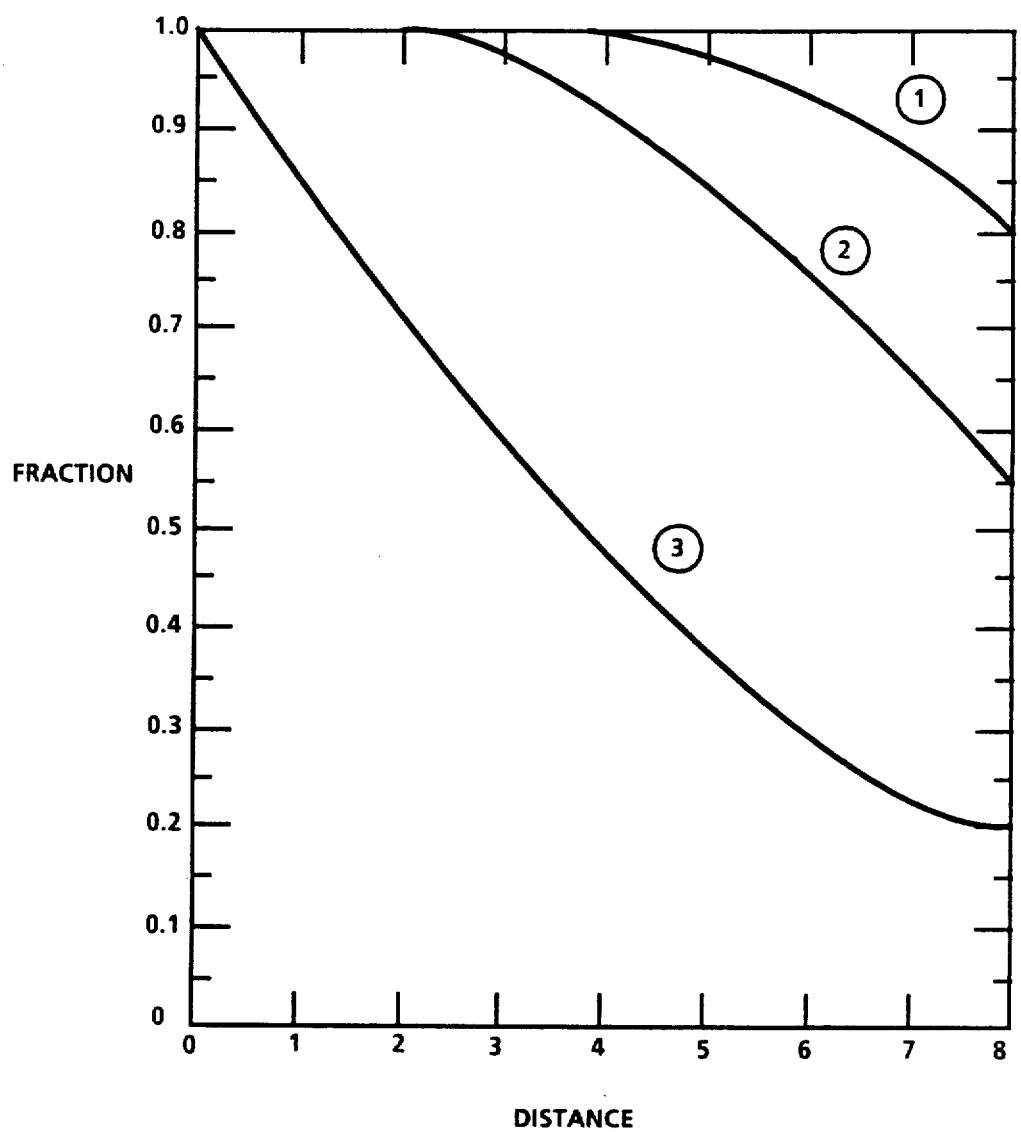
FIG. 6 is a graph illustrating the fraction of three sample inputs in each field of attraction as a function of the distance between the sample inputs and the learned inputs to the array prior to processing by the array.
Figure 7:
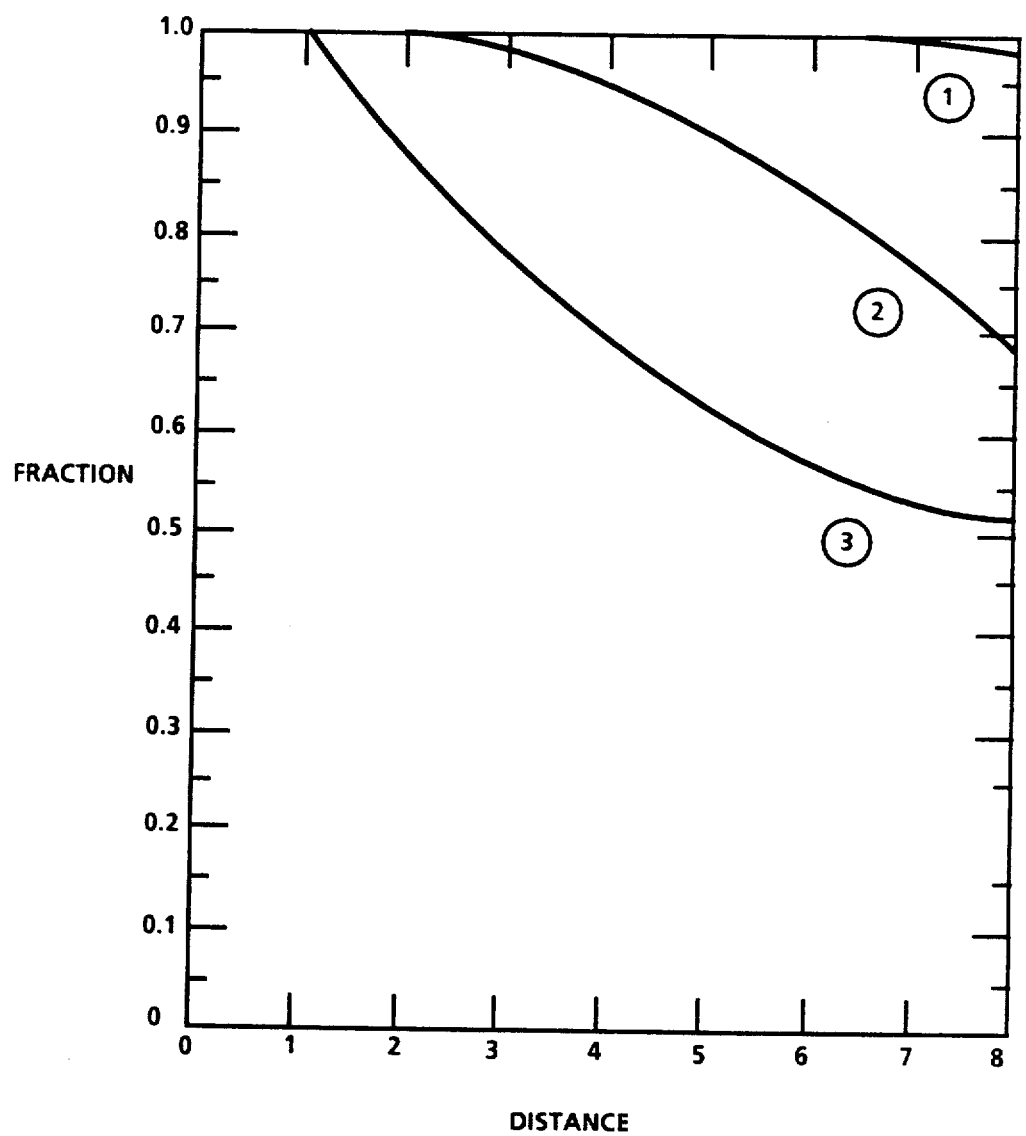
FIG. 7 is a graph illustrating the fraction of three sample inputs in each field of attraction as a function of the distance between the sample inputs and the learned inputs to the array after processing by the array.

FIG. 6 illustrates the fraction of three sample inputs that are in each basin of attraction as a function of the distance between the sample input and the learned input in the original cell array with the cell integer B initially set to zero. FIG. 7 illustrates the fraction of the same three sample inputs that are in each basin of attraction as a function of the distance between the sample input and the learned input after coalescence. As illustrated in FIGS. 6 and 7, the process of association produces a broad aggregation of clouds of inputs surrounding the original inputs. This implies that when associating two specific behavioral responses, the same output can be elicited by operating with inputs which are close to the original ones. Similar results were also observed in the opposite limit of trying to dissociate inputs which originally produced the same outputs.

Although the basins of attraction are initially of equal size, after adaptation, the fields for the learned inputs grew at the expense of others. Specifically, for the case of an array with 6 columns and 10 rows, there are $2^6$ fields, and each one has 1/64th or 1.6% of the inputs in its basin. After the coalescence experiment described above relative to FIG. 7, the field containing the three contracted inputs included almost 4% of the inputs in its basin of attraction. Similarly, in the other experiment in which the three inputs were separated or dissociated, the final basins of attraction contained 4%, 2% and 2% of the inputs, respectively.

An interesting consequence of this investigation is the correlation between the ability to quickly associate a set of given inputs and the initial state of the array. Generally, merging two basins of attraction, as illustrated in FIG. 5, when starting with all cells having the same state, i.e., a uniform state, was much simpler in taking fewer passes through the array than starting with an array which had already adapted to a particular set of inputs. This became particularly evident in experiments where the initial setup comprised two separate inputs and a uniform array with B set to zero, followed with the application of the contracting rule to associate them together and then followed by the expanding rule to separate them. The time required to separate them was much longer than the time that it took to merge them into the same basin of attraction. In this connection, see the similar results for the inputs of Table I.

Figure 3:
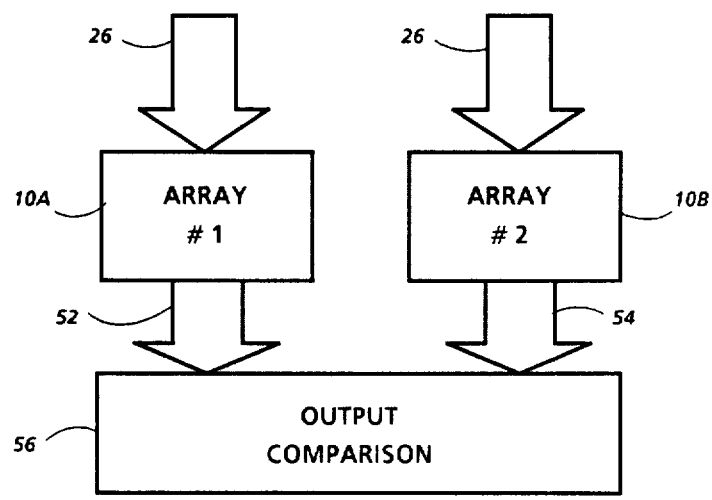
FIG. 3 is a diagram illustrating a particular utility of the array using more than one adaptive processor array.

FIG. 3 illustrates an application of array 10. In FIG. 3, system 50 comprises two separate cell arrays 10A and 10B of this invention. This architecture provides for pattern recognition of both broad categories and narrow categories relative to input data 26 under investigation. By setting the parameters in the two arrays 10A and 10B to different values, the sizes of basins of attractions in either array can be controlled to be of different size. For example, array 10A could be set to have large basins with many inputs producing the same output. If the other array 10B is set to produce narrow basins of attractions for the very same inputs, array 10B will distinguish among inputs that array 10A would classify as the same. Thus, by reading output 52 of array 10A first and then reading next output 54 of array 10B, output comparison 56 can provide selection of a broad category or classification (e.g., animal) via output 52, which can then be more finely analyzed to describe a particular aspect of the broad classification (e.g., cat) via output 54. System 50 will allow for efficient searches in data based structures or environments.

Figure 8:
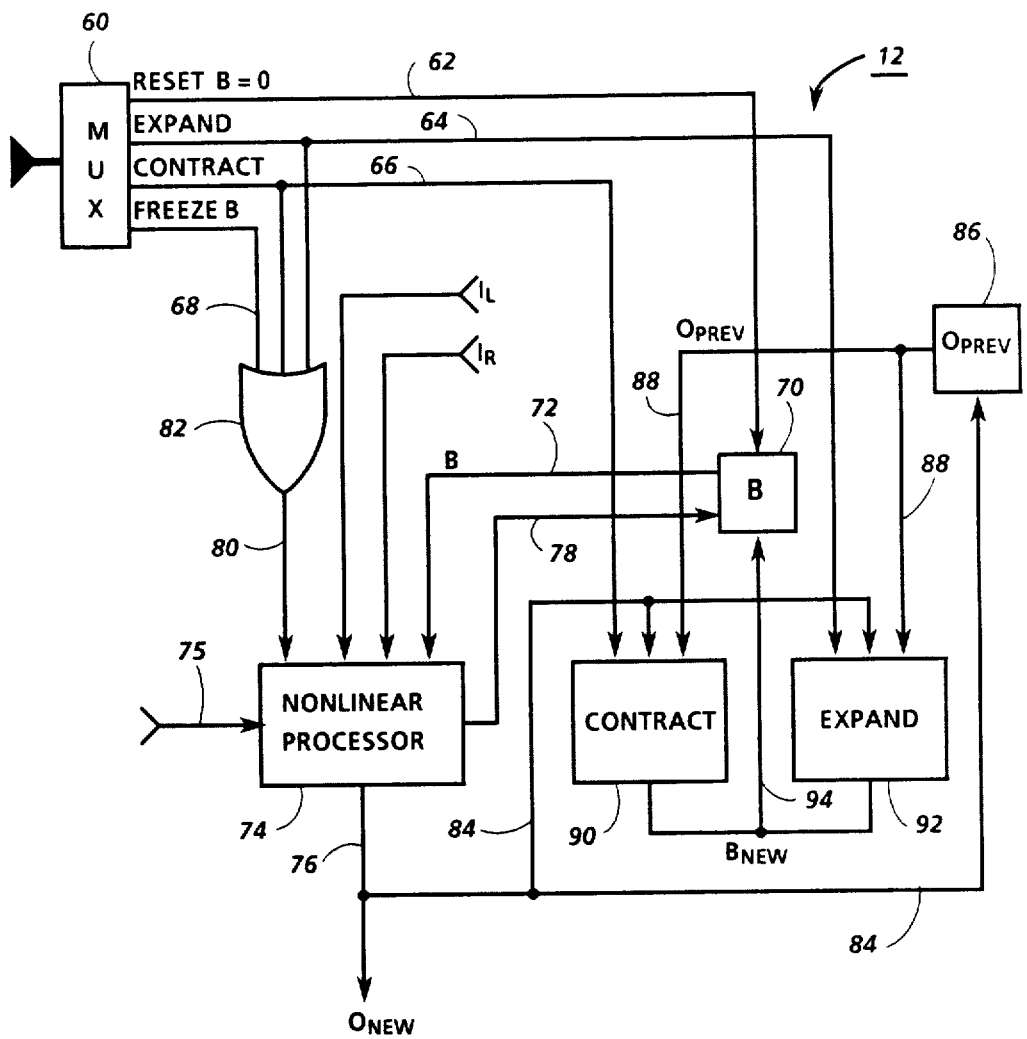
FIG. 8 is a circuit representation employed for the array cells.

FIG. 8 is a schematic illustration of the circuitry for an array cell 12. Condition values for cell operation are received via multiplexor 60. These four conditions have been previously explained and comprise condition: reset B equal to zero on line 62, condition: set cell true for operation under the expanding rule on line 64, condition: set cell true for operation under the expanding rule on line 66 and condition: freeze the value B on line 68. Line 62 is connected to register 70 which maintains the cell value for integer B. The output of register B is connected via line 72 to nonlinear processor 74 which contains the logic for providing output, $O_{NEW}$, on line 76 and for freezing the value B via line 78 to register 70. Circuit 74 has four inputs: input $I_L$, input $I_R$, value B, and input 80 which is the OR'd input value of the true status for local rule lines 64, 66 and the status value of FREEZE B. Processor 74 executes equation (1) and, therefore, comprises, for example, an adder for inputs $I_L$ and $I_R$, the added result of which is given the appropriate sign $s(I_L, I_R)$ as designated via input 75. Input 75 depends upon the particular row of cells involved, designated to have the numerical sign as a primary input of either $I_L$ or $I_R$. The added value with the appropriate sign is then added via a second adder to the present internal state B.

Output 76 (which is synonymous to outputs 22 and 24) is also fed back to register 86 via line 84, which register retains the value for the previous output, $O_{PREV}$. For every new output, $O_{NEW}$, the value of $O_{PREV}$ in register 86 is set to that new value. The output, $O_{PREV}$ of register 86 is connected respectively as an input to contract rule logic 90 and expand rule logic 92 via line 88. Also line 84 carrying the new output value, $O_{NEW}$, is supplied as an input to both contract rule logic 90 and expand rule logic 92. The last of three inputs to logic 90 and 92 is, respectively, the true lines 66 and 64 to enable these circuits to function according to their respective local rule but not to operate simultaneously. Logic circuits 90 and 92 may be operated alternately or in serial sequences or in sequence.

The output of logic circuits 90 and 92 on line 94 is a third input to register 70 and will be a new value for the integer B to be stored in register 70 unless line 78 is true, in which case the value B will remain unchanged and the value on line 94 will be ignored.

For example, when $S_{max} = -S_{min} = 15$, the binary values for inputs for inputs $I_L$ and $I_R$ as well as registers 70 and 86 can be represented with five bits, four bits to represent the numerical value and one bit to represent the sign of the value.

In operation, assume that the contracting rule is being applied to cell 12, line 66 will be true enabling contract rule logic 90. Line 64 will not be true disabling expand rule logic 92. The inputs $I_L$ and $I_R$ supplied on lines 22 and 24 will be for purposes of learning association to the same basin of attraction. Thus, the value of B in register 70 is set to zero via line 62. The previous output $O_{PREV}$ is set to contract rule logic 90 via line 88. The output $O_{NEW}$ produced according to equation (1) is calculated in processor 74 and sent out to connected cells on output line 76. Also $O_{NEW}$ is supplied as an input to contract rule logic 90 via line 84. Contract rule logic 90 will compute a new value for B according to the contracting rule and provide $B_{NEW}$ for storage in register 70 via line 94. On the next sequential pass of inputs $I_L$ and $I_R$, the computation of output, $O_{NEW}$ will occur again at circuit 74 using the new value for B.

In computing $O_{NEW}$, input 75 to processor 74 determines whether the sign of $O_{NEW}$ should be that of $I_L$ or $I_R$, depending upon which of the two is the primary input. However, if the value of B on line 72 is zero, the sign taken by processor 74 will be that of the secondary input.

When several sample inputs have been iterated via the procedure explained above, each cell 12 in array 10 will have achieved a particular integer value B in its register 70. At this point in time, if computation of other inputs is desired to determine whether they fall inside or outside the field of inputs or basin of attraction under consideration, the process described above is repeated except that the integer value of B is frozen and lines 68, 80 and line 78 via processor 74 are true. The functions of contraction and expansion are terminated and processor 74 of each of the cells 12 will perform iterations on parallel inputs and determine whether any given input falls inside or outside a "learned" basin of attraction. This is easily accomplished by comparing the final parallel outputs known from the array learning experience and comparing them with the final parallel outputs for the inputs in question to determine if they are the same and therefore fall within the previously formed basin of attraction.

The procedure for initial array learning for the implementation of the expand rule via logic 92 is the same as that explained above for the contracting rule except that line 64 is true enabling expand rule logic 92 and line 66 is not true disabling contract rule logic 90.

While the invention has been described in conjunction with specific limited embodiments, it is evident to those skilled in this art that many alternatives, modifications and variations will be apparent and appreciated in light of the foregoing description. Accordingly, this invention is intended to embrace all such alternatives, modifications and variations as fall within the spirit and scope of the appended claims.

What is claimed is:

1. An adaptive processor array comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, each given cell (except for end row cells) in intermediate rows of said cells between said first and last rows having inputs each representing a data value coupled from two cells in a previous cell row positioned diagonally relative to said given cell, said logic means in each cell to compute a new data value based upon said diagonal inputs and its present memory state, said given cell (except for end row cells) coupled to two cells in the subsequent row positioned diagonally relative to said given cell, said new data value provided as an output to said diagonally coupled subsequent row cells, said logic means in each cell to evaluate the new data values received from said diagonally connected previous row cells and accordingly update its memory state by changing said new data values to a modified data value either toward or away from said new data values possessing respectively the same value or a greater separation in value and provide said modified value as a cell output, said updating of said memory state accomplished within a set range of values, said logic means further including means to classify said inputs as falling within one of two possible states based upon evaluation relative to said updated memory states, one of said states being interpretative of said inputs inside a designated field of inputs and the other of said states being interpretative of said inputs being outside a designated field of inputs.

2. An adaptive processor array comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, each given cell (except for end row cells) in intermediate rows of said cells between said first and last rows having inputs each representing a data value coupled from two cells in a previous cell row positioned diagonally relative to said given cell, said logic means in each cell to compute a new data value based upon said diagonal inputs and its present memory state, said given cell (except for end row cells) coupled to two cells in the subsequent row positioned diagonally relative to said given cell, said new data value provided as an output to said diagonally coupled subsequent row cells, said logic means in each cell to evaluate the new data values received from said diagonally connected previous row cells and accordingly update its memory state by changing said new data values to a modified data value either toward or away from said new data values possessing respectively the same value or a greater separation in value and provide said modified value as a cell output, said logic means further including means to classify said inputs as falling within one of two possible states based upon evaluation relative to said updated memory states, one of said states being interpretative of said inputs inside a designated field of inputs and the other of said states being interpretative of said inputs being outside a designated field of inputs and means to inhibit further change to said cell memory states wherein the introduction of a subsequent parallel input to said array provides a parallel output therefrom indicative as to whether it falls inside or outside of a class of inputs based upon the set memory states of said cells.

3. An adaptive processor Processor array comprising:
a plurality of identical processing cells arranged in parallel columns and rows to form a two dimensional matrix,
the first row of said cells in the array forming a parallel input to the array, each cell of said first row adapted to receive an input signal from a signal source,
subsequent rows of said cells diagonally coupled to neighborhood cells in a previous row,
means in each of said cells to receive an input signal from said diagonally coupled cells in a previous cell row,
means in each of said cells to transmit an output signal to diagonally coupled cells in a subsequent cell row,
memory means in each cell to store a value therein,
logic means to perform simultaneous iterative calculations in the cells of each row based upon said diagonally received input signals wherein the cells of each cell row calculate new values based upon previous cell values represented by said received input signals, each new calculated value being representative of a gravitation toward one of two states,
means to update the memory value in each of said cells to store said new value if the latter represents a gravitation,
the last row of said cells in the array forming a parallel output from the array, said parallel output representative of a response indicative of whether said parallel input is one of a number of possible inputs in a class of inputs determined by said states and thereby representative of belonging in said class,
means in each of said cells to inhibit a change in the value in a cell when the value therein has reached a predetermined level.

4. An adaptive processor processor array comprising:
a plurality of identical processing cells arranged in parallel columns and rows to form a two dimensional matrix,
the first row of said cells in the array forming a parallel input to the array, each cell of said first row adapted to receive an input signal from a signal source,
subsequent rows of said cells diagonally coupled to neighborhood cells in a previous row,
means in each of said cells to receive an input signal from said diagonally coupled cells in a previous cell row,
means in each of said cells to transmit an output signal to diagonally coupled cells in a subsequent cell row,
memory means in each cell to store a value therein,
logic means to perform simultaneous iterative calculations in the cells of each row based upon said diagonally received input signals wherein the cells of each cell row calculate new values based upon previous cell values represented by said received input signals, each new calculated value being representative of a gravitation toward one of two states, said states being a state of dissimilarity and a state of similarity,
means to update the memory value in each of said cells to store said new value if the latter represents a gravitation,
the last row of said cells in the array forming a parallel output from the array, said parallel output representative of a response indicative of whether said parallel input is one of a number of possible inputs in a class of inputs determined by said states and thereby representative of belonging in said class.

5. A method of parallel processing a plurality of input signals from a data source representative of a wave of data to a parallel array of processor cells to provide a determination of whether an input is recognized as one of a plurality of inputs belonging to a particular predetermined field of possible inputs, each cell in said array having an internal state represented by an integer value, said method comprising the steps of:
(I) extending said input signals in parallel fashion through said array such that a given cell in intermediate cell rows of said array are connected to diagonally positioned neighboring cells in an immediately previous cell row providing a pair of inputs from two different previous row cells to said given cell and further connected to diagonally positioned neighboring cells in an immediate subsequent cell row providing a pair of identical outputs from said given cell,
(II) processing the pair of inputs received by said given cell to produce an output which further comprises the steps of:
(a) adding together the integer value of said pair of inputs to said given cell,
(b) choosing a sign value for the added integer value based upon the particular row in which said given cell resides and based upon whether or not the present internal state in said given cell is zero,
(c) adding the internal state value present in said given cell to the added value of said inputs,
(d) transferring the resultant integer value as an output from said given cell, and
(e) restricting the resultant integer value to a specified range of integer values.

6. The method of any one of claims 4 and 5 which includes the steps of:
(I) retaining the previous output resultant integer value of said given cell,
(II) moving the internal state value present in said given cell toward one of two possible states based upon said inputs, said one state characterized as a state of similarity, the step of moving further comprising the steps of:
(a) changing the present cell internal state value by incremental integers of one if the multiplied value of the present output and the previous output is less than zero, and
(b) choosing the sign value for the incremented internal state value to have the sign of the output with the largest integer magnitude.

7. The method of claim 6 including the step of inhibiting the operation of step (II) if at least one of either of the values of the present output or the previous output are at the extrema of a specified range of integer values designated for said given cell output.

8. The method of any one of claims 4 and 5 which includes the steps of:
(I) retaining the previous output resultant integer value of said given cell,
(II) moving the internal state value present in said given cell toward one of two possible states based upon said inputs, said one state characterized as a state of dissimilarity, the step of moving further comprising the steps of:
  (a) changing the present cell internal state value by incremental integers of one if the multiplied value of the present output and the previous output is greater than zero, and
  (b) choosing the sign value for the incremented internal state value to have the sign opposite of that of either of said present and previous outputs.

9. The method of claim 8 including the step of inhibiting the operation of step (II) if at least one of either of the values of the present output or the previous output are at the extrema of a specified range of integer values designated for said given cell output.

10. An adaptive processor array comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, each given cell (except for end row cells) in intermediate rows of said cells between said first and last rows having inputs each representing a data value coupled from two cells in a previous cell row positioned diagonally relative to said given cell, said logic means in each cell to compute a new data value based upon said diagonal inputs and its present memory state, said new data value taking on the sign of one of said cell diagonal inputs designated as the primary input, said given cell (except for end row cells) coupled to two cells in the subsequent row positioned diagonally relative to said given cell, said new data value provided as an output to said diagonally coupled subsequent row cells, said logic means in each cell to evaluate the new data values received from said diagonally connected previous row cells and accordingly update its memory state by changing said new data values to a modified data value either toward or away from said new data values possessing respectively the same value or a greater separation in value and provide said modified value as a cell output, said logic means further including means to classify said inputs as falling within one of two possible states based upon evaluation relative to said updated memory states, one of said states being interpretative of said inputs inside a designated field of inputs and the other of said states being interpretative of said inputs being outside a designated field of inputs.

11. The adaptive processor array of claim 10 wherein if the data value of said primary input is zero, said new data value takes on the sign of the other of said cell diagonal inputs designated as the secondary input.

12. An adaptive processor array comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, each given cell (except for end row cells) in intermediate rows of said cells between said first and last rows having inputs each representing a data value coupled from two cells in a previous cell row positioned diagonally relative to said given cell, said logic means in each cell to compute a new data value based upon said diagonal inputs and its present memory state, said given cell (except for end row cells) coupled to two cells in the subsequent row positioned diagonally relative to said given cell, said new data value provided as an output to said diagonally coupled subsequent row cells, said logic means in each cell to evaluate the new data values received from said diagonally connected previous row cells and accordingly update its memory state by changing said new data values to a modified data value either toward or away from said new data values possessing respectively the same value or a greater separation in value and provide said modified value as a cell output, said logic means further including means to classify said inputs as falling within one of two possible states based upon evaluation relative to said updated memory states, one of said states being interpretative of said inputs inside a designated field of inputs and the other of said states being interpretative of said inputs being outside a designated field of inputs, said classifying means proscribes a rule of contraction wherein if a cell new data value times its previous data value is less than zero, the memory state of the cell is changed by the value of one with the sign of said change either the sign of said new data data value or said previous data value dependent upon which value thereof is the largest in magnitude, otherwise the value of said cell memory state remains unchanged.

13. The adaptive processor array of claim 12 wherein said change of cell memory state is accomplished within a set range of data values.

14. The adaptive processor array of claim 13 wherein said set range of data values include negative and positive values.

15. An adaptive processor array comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, each given cell (except for end row cells) in intermediate rows of said cells between said first and last rows having inputs each representing a data value coupled from two cells in a previous cell row positioned diagonally relative to said given cell, said logic means in each cell to compute a new data value based upon said diagonal inputs and its present memory state, said given cell (except for end row cells) coupled to two cells in the subsequent row positioned diagonally relative to said given cell, said new data value provided as an output to said diagonally coupled subsequent row cells, said logic means in each cell to evaluate the new data values received from said diagonally connected previous row cells and accordingly update its memory state by changing said new data values to a modified data value either toward or away from said new data values possessing respectively the same value or a greater separation in value and provide said modified value as a cell output, said logic means further including means to classify said inputs as falling within one of two possible states based upon evaluation relative to said updated memory states, one of said states being interpretative of said inputs inside a designated field of inputs and the other of said states being interpretative of said inputs being outside a designated field of inputs, said classifying means proscribes a rule of separation wherein if a cell new data value times its previous data value is greater than zero, the memory state of the cell is changed by the value of one with the sign of said change given a sign opposite of both of said new data and previous data values, otherwise the value of said cell memory state remains unchanged.

16. The adaptive processor array of claim 15 wherein said change of cell memory state is accomplished within a set range of negative to positive data values.

17. The adaptive processor array of claim 16 wherein said set range of data values include negative and positive values.

18. An adaptive processor processor array comprising:
  a plurality of identical processing cells arranged in parallel columns and rows to form a two dimensional matrix,
  the first row of said cells in the array forming a parallel input to the array, each cell of said first row adapted to receive an input signal from a signal source,
  subsequent rows of said cells diagonally coupled to neighborhood cells in a previous row,
  means in each of said cells to receive an input signal from said diagonally coupled cells in a previous cell row,
  means in each of said cells to transmit an output signal to diagonally coupled cells in a subsequent cell row, memory means in each cell to store a value therein,
  logic means to perform simultaneous iterative calculations in the cells of each row based upon said diagonally received input signals wherein the cells of each cell row calculate new values based upon previous cell values represented by said received input signals, each new calculated value being representative of a gravitation toward one of two states,
  means to update the memory value in each of said cells to store said new value if the latter represents a gravitation,
  the last row of said cells in the array forming a parallel output from the array, said parallel output representative of a response indicative of whether said parallel input is one of a number of possible inputs in a class of inputs determined by said states and thereby representative of belonging in said class and means to freeze the state of said cell memory states, the introduction of a subsequent parallel input to said array providing a parallel output therefrom indicative as to whether it falls inside or outside of said class.

19. In an adaptive processor array capable of being sensitized to a subset of classes of parallel inputs fed into the array out of a total of different possible classes thereof comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, cells in intermediate rows of said cells between said first and last rows having inputs each representing a data value coupled from two cells in a previous cell row positioned diagonally relative to said given cell, said logic means in each cell to compute a new data value based upon the summation of said diagonal inputs and a preconditioned memory state, said new data value provided as an output to said diagonally coupled subsequent row cells, and means to precondition the memory states of said cells by driving said diagonal inputs toward values of either closer magnitude or more separated magnitude to collectively divide the parallel inputs possible to said array into at least two predetermined classes of inputs, each parallel output from said array being representative of one of said classes, said preconditioning means comprises a rule of contraction wherein if a cell new data value times its previous data value is less than zero, the memory state of the cell is changed by the value of one with the sign of said change either the sign of said new data data value or said previous data value dependent upon which value largest data value magnitude, otherwise the value of said cell memory state remains unchanged.

20. In the adaptive processor array of claim 19 wherein said change of cell memory state is accomplished within a set range of data values.

21. In the adaptive processor array of claim 20 wherein said set range of data values include negative and positive values.

22. In an adaptive processor array capable of being sensitized to a subset of classes of parallel inputs fed into the array out of a total of different possible classes thereof comprising a plurality of identical processing cells arranged in parallel columns and rows to form a two dimensional matrix, each of said cells in said array having logic means and a memory for storing a memory state, the first row of said cells in the array forming a parallel input to the array, the last row of said cells in the array forming a parallel output from the array, cells in intermediate rows of said cells between said first and last rows having inputs each representing a data value coupled from two cells in a previous cell row positioned diagonally relative to said given cell, said logic means in each cell to compute a new data value based upon the summation of said diagonal inputs and a preconditioned memory state, said new data value provided as an output to said diagonally coupled subsequent row cells, and means to precondition the memory states of said cells by driving said diagonal inputs toward values of either closer magnitude or more separated magnitude to collectively divide the parallel inputs possible to said array into at least two predetermined classes of inputs, each parallel output from said array being representative of one of said classes, said preconditioning means comprises a rule of separation wherein if a cell new data value times its previous data value is greater than zero, the memory state of the cell is changed by the value of one with the sign of said change given a sign opposite of either of said new data data value or said previous data value, otherwise the value of said cell memory state remains unchanged.

23. In the adaptive processor array of claim 22 wherein said change of cell memory state is accomplished within a set range of negative to positive data values.

24. In the adaptive processor array of claim 23 wherein said set range of data values include negative and positive values.

25. A method of parallel processing a plurality of parallel inputs to an orthogonal array of processing cells with cells in intermediate rows of the array connected to diagonally positioned neighboring cells in an immediately previous cell row to receive a pair of inputs from two different previous row cells and connected to diagonally positioned neighboring cells in an immediately subsequent cell row to provide a pair of identical outputs therefrom, and comprising the steps of:

providing array cells with a memory to hold a memory state, presenting a series of first parallel inputs into the array, preconditioning the memory states of the cells by driving said diagonal inputs toward values of either closer magnitude or more separated magnitude to cause said array to collectively divide said first parallel inputs to the array into at least two predetermined classes of inputs wherein a parallel output from said array is representative of one of said classes, introducing a plurality of second parallel inputs into the array for classifying each such input as falling in one of said classes based upon the collective preconditioned memory states of the array cells, and summing, in each intermediate row cell, the pair of inputs from connected previous row cells with the preconditioned memory state of the cell.

26. The method of claim 25 wherein the step of summation provides a new resultant integer value as output to cells in a immediately subsequent row and includes the step of restricting said resultant integer value to a predetermined range of integer values.

27. A method of parallel processing a plurality of parallel inputs to an orthogonal array of processing cells with cells in intermediate rows of the array connected to diagonally positioned neighboring cells in an immediately previous cell row to receive a pair of inputs from two different preveious row cells and connected to diagonally positioned neighboring cells in an immediately subsequent cell row to provide a pair of identical outputs therefrom, and comprising the steps of:

providing array cells with a memory to hold a memory state, presenting a series of first parallel inputs into the array, preconditioning the memory states of the cells by driving said diagonal inputs toward values of either closer magnitude or more separated magnitude to cause said array to collectively divide said first parallel inputs to the array into at least two predetermined classes of inputs wherein a parallel output from said array is representative of one of said classes and including the steps of producing an integer value if the present output of the cell times the previous output of the cell is less than the value of zero and increasing or decreasing the memory state value of the cell by said integer value if the output of largest magnitude relative to said present output and said previous output is respectively positive or negative, and introducing a plurality of second parallel inputs into the array for classifying each such input as falling in one of said classes based upon the collective preconditioned memory states of the array cells.

28. A method of parallel processing a plurality of parallel inputs to an orthogonal array of processing cells with cells in intermediate rows of the array connected to diagonally positioned neighboring cells in an immediately previous cell row to receive a pair of inputs from two different previous row cells and connected to diagonally positioned neighboring cells in an immediately subsequent cell row to provide a pair of identical outputs therefrom, and comprising the steps of:

providing array cells with a memory to hold a memory state, presenting a series of first parallel inputs into the array, preconditioning the memory states of the cells by driving said diagonal inputs toward values of either closer magnitude or more separated magnitude to cause said array to collectively divide said first parallel inputs to the array into at least two predetermined classes of inputs wherein a parallel output from said array is representative of one of said classes and including the steps of producing an integer value if the present output of the cell times the previous output of the cell is greater than the value of zero and increasing or decreasing the memory state value of the cell by said integer value if the present and previous output values are both respectively negative or positive, and introducing a plurality of second parallel inputs into the array for classifying each such input as falling in one of said classes based upon the collective preconditioned memory states of the array cells.

29. The method as in claim 27 or 28 wherein said integer value is one.

30. The method as in claim 27 or 28 which includes the step of restricting said integer value to a predetermined range of integer values.

* * * * *